United States Patent
Wu et al.

(10) Patent No.: US 6,911,915 B2
(45) Date of Patent: Jun. 28, 2005

(54) COMPACT LIGHT EMITTING DIODE RETROFIT LAMP AND METHOD FOR TRAFFIC SIGNAL LIGHTS

(75) Inventors: Chen H. Wu, Los Altos Hills, CA (US); Steve Bacilieri, Hunt, TX (US); Chao Sung Wang, Chung Ho (TW); Shih Chang Wang, Chung Ho (TW)

(73) Assignee: Leotek Electronics Corporation, Santa Clara, CA (US)

( * ) Notice: Subject to any disclaimer, the term of this patent is extended or adjusted under 35 U.S.C. 154(b) by 0 days.

(21) Appl. No.: 10/449,944

(22) Filed: May 30, 2003

(65) Prior Publication Data

US 2004/0070519 A1 Apr. 15, 2004

Related U.S. Application Data

(60) Provisional application No. 60/408,258, filed on Sep. 4, 2002.

(51) Int. Cl.[7] .................................................. G09F 9/33
(52) U.S. Cl. .................. 340/815.45; 362/244; 362/249
(58) Field of Search ...................... 340/815.45; 362/244, 362/249, 310, 812

(56) References Cited

U.S. PATENT DOCUMENTS

| | | | |
|---|---|---|---|
| 1,539,090 A | | 5/1925 | King |
| 3,851,165 A | | 11/1974 | Beck et al. |
| 3,981,263 A | | 9/1976 | Capucio |
| 4,298,869 A | | 11/1981 | Okuno |
| 4,384,271 A | * | 5/1983 | Visser ........................ 362/296 |
| D338,726 S | | 8/1993 | Andersen et al. |
| 5,365,418 A | * | 11/1994 | Gardner ...................... 362/308 |
| 5,416,679 A | | 5/1995 | Ruskouski et al. |
| 5,561,346 A | | 10/1996 | Byrne |
| D385,051 S | | 10/1997 | Wu |
| 5,775,801 A | * | 7/1998 | Shaffer ....................... 362/310 |
| 5,806,965 A | * | 9/1998 | Deese ......................... 362/249 |
| 5,833,355 A | | 11/1998 | You et al. |
| 5,947,587 A | | 9/1999 | Keuper et al. |
| 5,949,347 A | | 9/1999 | Wu |
| 6,036,336 A | | 3/2000 | Wu |
| D424,715 S | | 5/2000 | Wu |
| 6,244,732 B1 | * | 6/2001 | Futami et al. .............. 362/328 |
| 6,268,801 B1 | | 7/2001 | Wu |
| 6,283,613 B1 | | 9/2001 | Schaffer |
| 6,439,743 B1 | * | 8/2002 | Hutchison ................... 362/244 |
| 6,502,956 B1 | | 1/2003 | Wu |
| 6,513,950 B1 | | 2/2003 | Ono |
| 6,558,021 B2 | | 5/2003 | Wu et al. |
| 6,614,358 B1 | * | 9/2003 | Hutchison et al. ...... 340/815.45 |
| 6,616,299 B2 | * | 9/2003 | Martineau ................... 362/244 |
| 6,761,471 B2 | * | 7/2004 | Wu ............................ 362/250 |
| 2003/0123254 A1 | | 7/2003 | Brass et al. |
| 2003/0185005 A1 | | 10/2003 | Sommers et al. |

OTHER PUBLICATIONS

U.S. Appl. No. 10/449,966, filed May 2003, Chen Wu.
Dialight Brochure (1999).
Leotek Brochure (1992).
Leotek Brochure (1996).
WACO Brochure (1999).

* cited by examiner

*Primary Examiner*—John Tweet, Jr.
(74) *Attorney, Agent, or Firm*—DLA Piper Rudnick Gray Cary US LLP

(57) ABSTRACT

A high power LED lamp and method for retrofitting conventional traffic signal lamps. The LED lamp includes a housing, a power supply disposed in the housing, a plurality of LEDs mounted to a substantially planar mounting surface in the housing and electrically connected to the power supply for producing diverging light, and a threaded electrical connector extending from the housing. The method includes replacing a conventional incandescent light bulb with the LED lamp, and installing a Fresnel lens inside the traffic signal lamp that collimates and just fills and illuminates the outer lens of the traffic signal lamp.

20 Claims, 4 Drawing Sheets

COMPACT LIGHT EMITTING DIODE RETROFIT LAMP AND METHOD FOR TRAFFIC SIGNAL LIGHTS

This application claims the benefit of U.S. Provisional Application No. 60/408,258, filed Sep. 4, 2002, and entitled Compact Light-Emitting Diode (LED) Retrofit Lamp For Traffic Signal Lights.

FIELD OF THE INVENTION

The present invention relates to Light-Emitting Diode (LED) lamps for traffic signal lamps, and more particularly to an improved compact LED lamp retrofit lamp for replacing conventional light bulbs in traffic signal lamps, including 12 and 8 inch round traffic signal lamps, pedestrian signs, hand signs, arrow signs and signs with messages.

BACKGROUND OF THE INVENTION

Light emitting diode (LED) lamps have been developed to replace conventional incandescent or fluorescent lamps for reducing electrical and maintenance costs, and for increasing reliability. LED lamps consume less electrical energy than conventional lamps while exhibiting much longer lifetimes. Such LED lamps typically include a power supply and a plurality of LEDs mounted on a flat or curved surface.

One growing use of LED lamps is the replacement of incandescent light bulbs in traffic signal lamps. A common conventional traffic signal lamp is illustrated in FIGS. 1A and 1B, and includes a housing 1, a front door plate 2, a lens 3, a reflector 4 and an incandescent light bulb 5. Retainers 6 affix the lens 3 to the front door plate 2, which opens via hinges 7 to allow access to the interior of the housing 1. Light bulb 5 screws into threaded electrical socket 8, which is electrically attached to a terminal strip 9, which in turn receives its power from the traffic signal controller.

It is known to replace the incandescent light bulb 5 with an LED lamp, along with the lens 3 since the lens may be designed specifically for the output of an incandescent light bulb. In a conventional traffic signal lamp retrofit procedure, the lens 3, light bulb 5, reflector 4 and socket 8 are all removed, and an LED lamp module 10 is installed onto the front door plate 2 to replace lens 3, as illustrated in FIG. 2. Wires 11 from the LED lamp module are connected to the terminal strip 9. The lamp module 10 includes up to several hundred LEDs all mounted on a flat printed circuit board and are evenly distributed across the lens area.

The above mentioned retrofit method has several drawbacks. First, it is time consuming and labor intensive to remove the reflector and socket, and access the terminal strip with new wiring. Because traffic is usually blocked in order to access traffic lights, time is of the essence. Second, in order to safely disconnect the socket connector wires from the terminal strip, and connect new wires from the LED lamp module to the terminal strip, the power to the traffic signal must be temporarily turned off, which disrupts traffic flow through the intersection. Finally, once the retrofit is complete, it is not possible to put the original incandescent lamp back in the traffic signal lamp, for example, in case a spare LED lamp module is not available.

U.S. Pat. No. 6,268,801, which is incorporated herein by reference, discloses a method and apparatus for retro-fitting traffic signal lamps with LED modules, without having to remove the reflector 4 and socket connector 8, and without having to access the terminal strip with new wiring. The LED module disclosed in this patent includes a plurality of light emitting diodes evenly distributed on a flat PC board that is the size of lens 3, a power supply electrically connected to the plurality of light emitting diodes, and wires extending from the power supply that terminate in a threaded electrical connector compatible with the socket connector 8. The method of retrofitting the traffic signal lamp includes removing the lens from the front door plate, removing the threaded light bulb from the socket connector, affixing the LED lamp module to the front door plate, and connecting the threaded electrical connector of the LED lamp module to the socket connector. This retrofit procedure is simple, takes very little time and labor, and can be safely performed without turning power off to the traffic signal lamp. Typical traffic signal lamps have lenses that are 8 or 12 inches in diameter. As long as the outer rim of LED lamp module has a similar shape and diameter as the outer rim of the lens, then the same retainers that secured the lens in place onto the front door plate can be used to secure the LED lamp module in place. Thus, the LED lamp module preferably has a flange that is shaped and sized to match the outer rim of the lens that it replaces.

It is also well known in the art to make LED lamps by mounting a plurality of outwardly facing LEDs to a spherical lamp head, which terminates with a threaded electrical connector. Such an LED lamp simulates the light distribution of a standard light bulb, except the light is generated by the outwardly facing LEDs instead of an internal filament. This LED lamp can be easily substituted for a conventional traffic light bulb, but the intensity from such a lamp can be problematic. Not only is it difficult to mount enough LEDs on the spherical lamp head to produce the desired luminosity, but light emanating therefrom must still reflect off of the reflector, which can be optically lossy and degrade over time. The traffic light lens may also have to be replaced to produce the desired radiation pattern.

Recently, more efficient and higher power LEDs have been developed that reduce the number of LEDs which are necessary to meet signal lamp output intensity requirements (e.g. can be as few as 2 for some applications). For example, Dialight Corporation (of Farmingdale, N.J.) markets an LED module 12 (shown in FIG. 3) containing only eighteen high power LEDs 14, which provide as much light output as a conventional eighty to three hundred LED array on a twelve inch diameter circuit board. To provide an aesthetically acceptable appearance, the Dialight LED module has all eighteen LEDs 14 mounted together in a concentrated small cluster on the rear wall 15 of the module's housing 13. A planar Fresnel lens 16 and curved outer lens 17 are both mounted to the flange 18 that engages with the front door plate of the traffic signal lamp housing. The Fresnel lens 16 collimates the diverging light output from the high power LEDs to evenly illuminate the outer lens 17. Wires 19 extend from the LED module for connection to the traffic signal lamp's terminal strip.

In order to fully illuminate the Fresnel/outer lenses 16/17, the LEDs 14 must be placed a minimum distance $D_1$ behind the Fresnel lens. For a 12 inch diameter module, even with the LEDs placed at the very rear of the module, the distance $D_2$ between the front surface of the flange 18 and the rear wall 15 still exceeds approximately 109 mm ($D_2$ for 8 inch diameter module exceeds approximately 102 mm). Moreover, since there is no room behind the LEDs for the module's power supply 20, the housing sidewall must extend laterally far enough to accommodate the module's power supply 20 so that it does not block the light emitted by the LEDs from reaching the lenses 16/17. Since most conventional 12 inch diameter traffic signal lamps have a depth of approximately 112 mm±2 mm (measured from the back surface of the door plate 2 to the bottom of reflector 4 or to the socket connector 8 should it protrude up from the reflector bottom) and most conventional 8 inch diameter traffic signal lamps have a depth of approximately 80 mm±2 mm, and a spherical or parabolic shape that is narrower than the profile of the Dialight lamps, the depth and shape of these lamps simply prevents it from fitting inside conventional traffic lamp reflectors. Thus, the installation of the Dialight lamp is cumbersome and time consuming because it requires removal of the existing traffic signal lamp reflector, electrical socket, and electrical connection to the terminal strip.

There is a need for a high power LED lamp and method for retrofitting conventional traffic signal lamps with reflectors.

SUMMARY OF THE INVENTION

The present invention solves the aforementioned problems by providing an LED lamp and method for retrofitting conventional traffic signal lamps, without having to remove or utilize the reflectors therein.

The traffic signal lamp of the present invention includes a signal housing, a front door plate attached to the signal housing, an outer lens and an inner lens attached to the front door plate, an optical reflector disposed in the signal housing, a threaded electrical socket connector disposed in the signal housing; and an LED lamp. The LED lamp includes a lamp housing, a power supply disposed in the lamp housing, a plurality of LEDs mounted to a substantially planar mounting surface in the lamp housing and electrically connected to the power supply for producing diverging light, and a threaded electrical connector extending from the lamp housing and engaged with the threaded electrical socket connector. The inner lens is a Fresnel lens that focuses the diverging light from the LEDs so that the light just fills and illuminates the outer lens without any appreciable amount of the light reflecting off of the optical reflector.

Another aspect of the present invention is a method of retrofitting a traffic signal lamp having a signal housing, a front door plate attached to the signal housing, an outer lens attached to the front door plate, an optical reflector disposed in the signal housing, a threaded electrical socket connector disposed in the signal housing, and an incandescent light bulb connected to the threaded electrical socket connector for producing light that is reflected off of the reflector and through the outer lens. The method includes at least partially detaching the front door plate to expose an inside of the signal housing, removing the incandescent light bulb from the threaded electrical socket connector, attaching a Fresnel lens to the front door plate, connecting an LED lamp to the threaded socket connector, and re-attaching the front door plate to the signal housing. The LED lamp includes a lamp housing, a power supply disposed in the lamp housing, a plurality of LEDs mounted to a substantially planar mounting surface in the lamp housing and electrically connected to the power supply for producing diverging light, and a threaded electrical connector extending from the lamp housing. The Fresnel lens focuses the diverging light from the LEDs so that the light just fills and illuminates the outer lens without any appreciable amount of the light reflecting off of the optical reflector.

Other objects and features of the present invention will become apparent by a review of the specification, claims and appended figures.

DETAILED DESCRIPTION OF THE PREFERRED EMBODIMENTS

The present invention is a compact, light weight LED lamp and lens set for retrofitting traffic lights using conventional incandescent light bulbs, lenses and reflectors.

Figure 4:
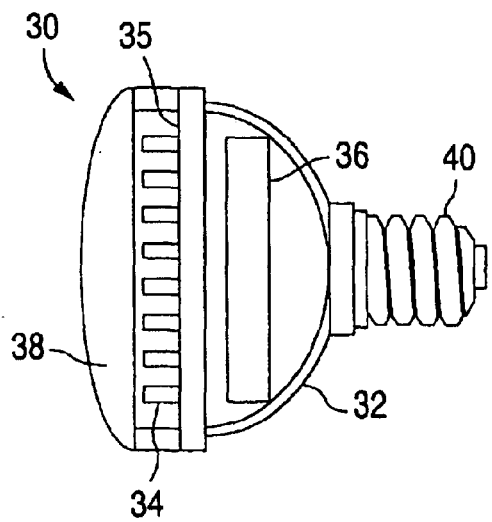
FIG. 4 is a side cross-sectional view of the high power LED lamp of the present invention.

The high power LED lamp 30 according to the present invention is illustrated in FIG. 4, and includes a housing 32, an array of high power LEDs 34 mounted inside the housing 32 preferably on a substantially planar mounting surface (e.g. PC board) 35 for producing a diverging light output, a power supply 36 disposed in the housing for supplying electrical power to the LEDs 34, and a threaded electrical connector 40 extending from the housing 32 and electrically connected to the power supply 36. The housing 32 includes an optical lens 38 disposed over the LEDs 34, to protect the LEDs and possibly focus down or expand the diverging light therefrom.

Figure 5:
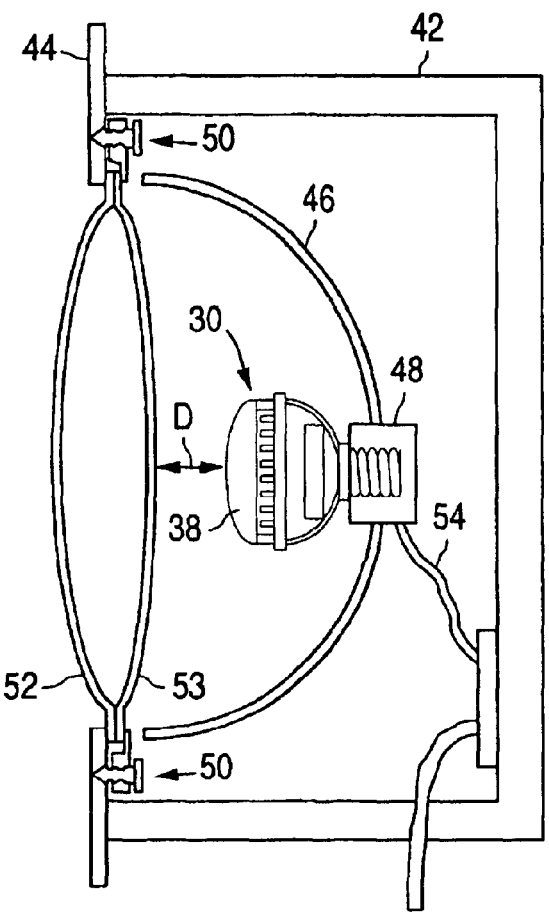
FIG. 5 is a side cross-sectional view of a traffic signal lamp retrofitted with the high power LED lamp of the present invention and a Fresnel lens set.

FIG. 5 illustrates a conventional traffic signal lamp retrofitted with the LED lamp 30 of the present invention. The retrofitted traffic signal lamp includes a signal lamp housing 42, a front door plate 44, a reflector 46 and a threaded socket connector 48. Retainers 50 secure the original traffic signal lamp (outer) lens 52 and a focusing (inner) Fresnel lens 53 to the front door plate 44, which opens via hinges to allow access to the interior of the signal lamp housing 42. The threaded electrical connector 40 of the LED lamp 30 screws into socket connector 48. Wires 54 connect socket connector 48 to a terminal strip 56, which receives its power from the traffic signal controller.

Figure 1A:
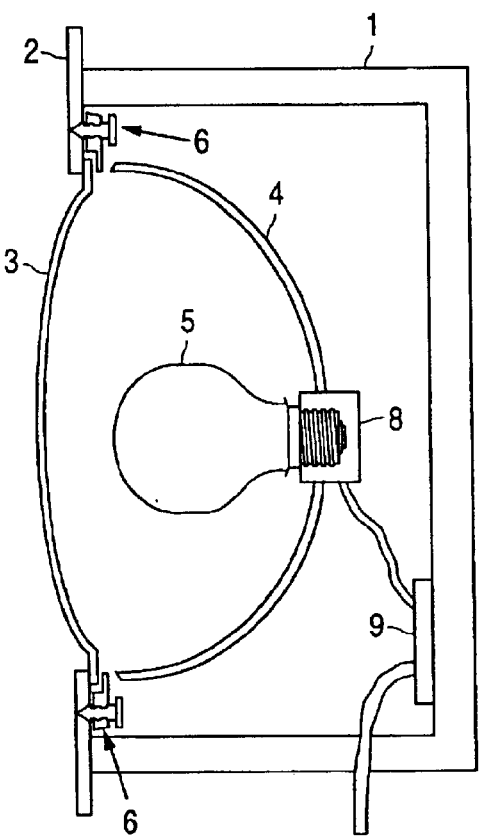
FIG. 1A is a side cross-sectional view of a conventional traffic signal lamp.
Figure 1B:
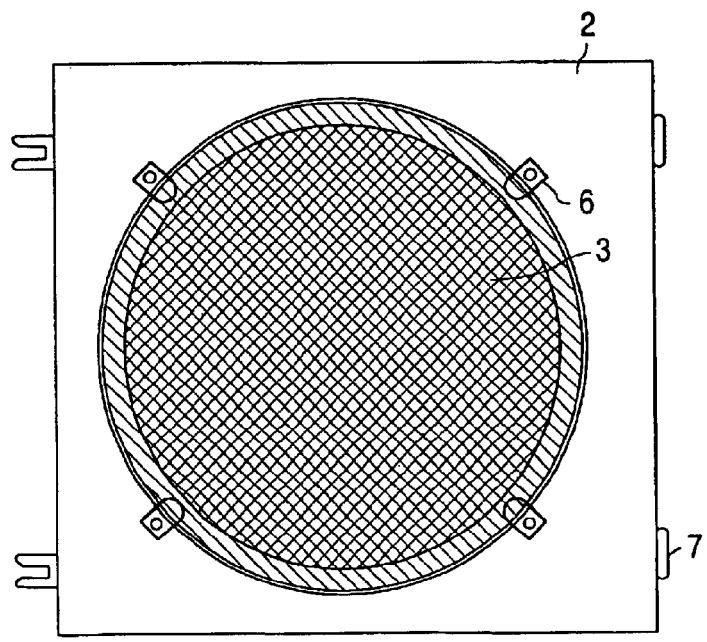
FIG. 1B is a back view of the front door from a conventional traffic signal lamp.
Figure 2:
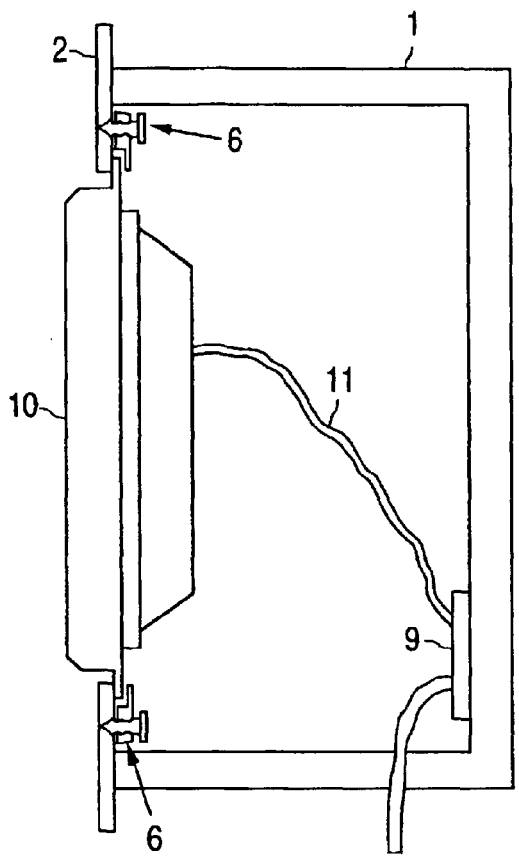
FIG. 2 is a side cross-sectional view of a conventional traffic signal lamp containing a conventional LED lamp module.
Figure 3:
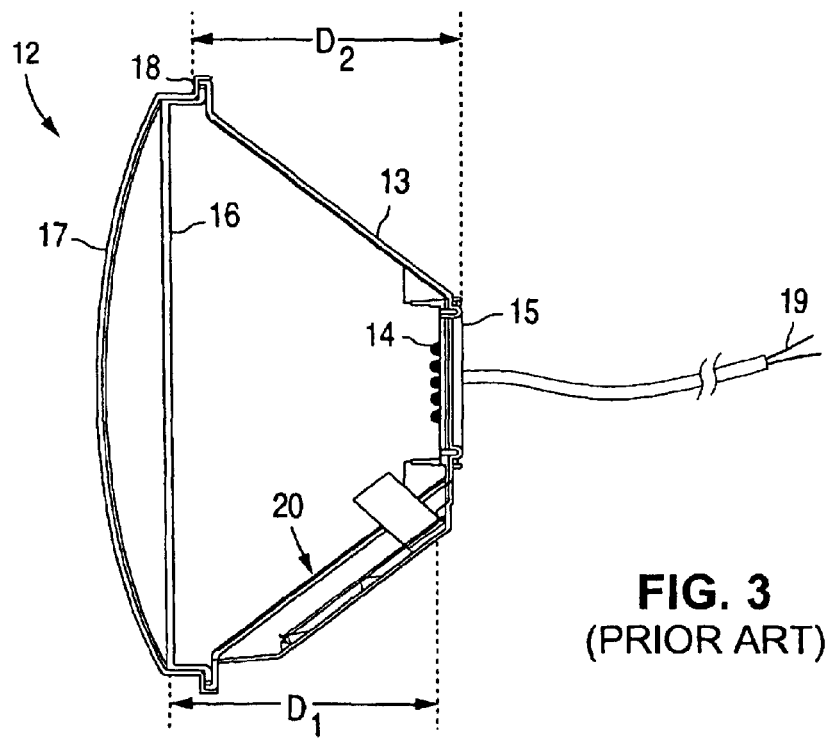
FIG. 3 is a side cross-sectional view of a conventional high power LED lamp module.

The method of installing the LED lamp 30 in a conventional traffic signal lamp (e.g. such as that shown in FIGS. 1A and 1B) includes rotating open the front door plate 44 to expose the inside of traffic signal lamp housing 42, removing the incandescent light bulb from socket connector 48, inserting threaded connector 40 of lamp 30 into the socket connector 48, installing Fresnel lens 53 on the inward side of existing lens 52 (using retainers 50), and closing the front door plate 44 (see FIG. 5). Subsequent replacement of LED lamp 30 is even simpler, because Fresnel lens 53 would already be in place and would not need replacement.

The Fresnel lens 53 is spaced a distance D from the LED lamp 30 and focuses the diverging light from LED lamp 30 so that it just fills and illuminates the entire traffic signal lens 52. Based upon the divergence of the light from the LEDs, and the distance between the LEDs 34 and the Fresnel lens 53, the optical focusing power of the Fresnel lens 53 is preferably, but not necessarily, selected so that the diverging light is substantially collimated as it illuminates lens 52. Using a non-planar (concave) Fresnel lens 53, as shown in FIG. 5, can reduce the distance between the LEDs 34 and Fresnel lens 53 (and thus distance D) necessary to collimate the diverging light. Preferably, lens 38 is a protective lens with no focusing power, but it could be designed for some applications to focus down or expand the diverging light from the LEDs before reaching the Fresnel lens 53. With the present invention, no significant amount of the light output used to illuminate the traffic signal lens 52 is reflected off of reflector 46, which avoids any optical loss caused by a degraded and/or contaminated reflector. Depending on the application, the original traffic signal lens 52 may be replaced with a new lens that further optimizes the optical output pattern from the traffic signal lamp.

For many traffic signal lamp applications, a non-symmetrical radiation output pattern therefrom may be desired. For example, if the traffic signal lamp is located over a roadway, the majority of the light output should be directed straight out of the lamp, and/or slightly downward toward the traffic. Alternately, portions of the traffic signal lens 52 may be opaque to produce characters or symbols, requiring less or no illumination on those portions of lens 52. Thus, the positioning of the LED's on the mounting surface 35 can be manipulated to produce a non-symmetrical light output from the LED lamp 30. In addition or alternately, the Fresnel lens 53 may have a non-symmetrical acceptance angle (to match the light output from, and the configuration of, the LEDs), and would require a specific (rotational) orientation relative to that of the LEDs. Moreover, one or both of the lenses 38/52 can asymmetrically focus the optical output to produce the desired non-symmetrical radiation pattern from the traffic signal lamp (e.g. directing light toward traffic not centered to the traffic signal lamp).

Figure 6:
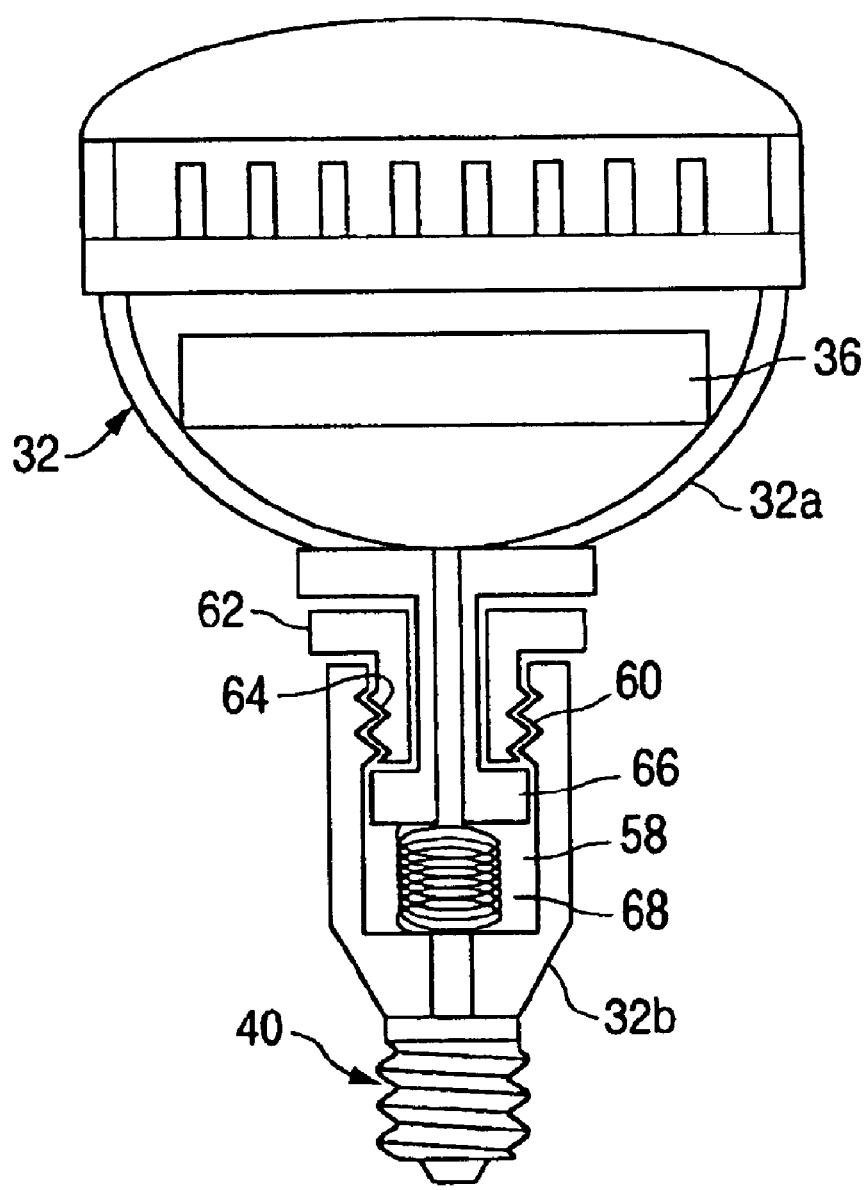
FIG. 6 is a side cross-sectional view of an alternate embodiment of the high power LED lamp of the present invention.

If the LED lamp 30 itself produces a non-symmetrical radiation output pattern, it is likely the LED lamp 30 will require a certain rotational orientation with respect to the traffic signal lamp housing 42 and/or lenses 52/53, which may be difficult to obtain given the use of the rotational electrical connectors 40/48. Therefore, the LEDs 34 and/or lens 38 may be selectively rotatable with respect to threaded electrical connector 40 to properly select their orientation after lamp 30 has been installed in the socket 48, in the manner illustrated in U.S. Pat. No. 6,036,336, which is incorporated herein by reference. For example, in the alternate embodiment shown in FIG. 6, housing 32 has an upper portion 32a (containing the LEDs) and a lower portion 32b (connected to the electrical connector 40) which are rotatably connected together. Housing lower portion 32b includes a hollow chamber 58 with internal threads 60 at its upper end, and a retainer 62 having external threads that engage with internal threads 60. The housing upper portion 32a includes a flange member 66 that is rotatably engaged with retainer 62. Once the external threads 64 of retainer 62 have fully engaged the internal threads 60 of chamber 58, then the housing upper portion 32a is selectively rotatable relative to the housing lower portion 32b. A spring 68 biases against the bottom wall of chamber 58 and the flange member 66 to induce friction between, and limit rotation between, the flange member 66 and retainer 62, for selective positioning of the LED housing upper portion 32a relative to the electrical connector 40. Wires (not shown) electrically connect the power supply 36 to the threaded electrical connector 40. It should be noted that there are alternate ways of affixing the retainer 62 to the housing lower portion 32b than the use of threads, such as with screws, etc.

The present invention allows for the replacement of an incandescent light bulb in a conventional traffic signal lamp (with the LED lamp 30 of the present invention) in just minutes, even if the outer lens 52 requires replacement as well. The advantages of the present invention include: 1) using more efficient and fewer high power LEDs, 2) reducing installation times (which saves installation costs and reduces traffic interruption), 3) projecting the LED light output directly on lenses 52/53 without the use of a reflector, and 4) eliminating the need for removal and disposal of reflectors and socket connectors from traffic signal lamps retrofitted with LED lamps.

It is to be understood that the present invention is not limited to the embodiment(s) described above and illustrated herein, but encompasses any and all variations falling within the scope of the appended claims. For example, the existing lens 52 on the traffic signal lamp, and/or the lens that replaces it, may not have any optical focusing power on the light passing there-through, but instead may simply be colored or may be selectively opaque to form characters or symbols. Further, one in the art will appreciate that the collimating effect of the Fresnel lens 53 does not necessarily result in perfectly collimated light, but rather the light collimated by the Fresnel lens is simply less divergent than it was when it entered the Fresnel lens.

What is claimed is:

1. A traffic signal lamp, comprising:
   a signal housing;
   a front door plate attached to the signal housing;
   an outer lens and an inner lens attached to the front door plate;
   an optical reflector disposed in the signal housing;
   a threaded electrical socket connector disposed in the signal housing; and
   an LED lamp that includes:
      a lamp housing,
      a power supply disposed in the lamp housing,
      a plurality of LEDs mounted to a substantially planar mounting surface in the lamp housing and electrically connected to the power supply for producing diverging light, and
      a threaded electrical connector extending from the lamp housing and engaged with the threaded electrical socket connector;
   wherein the inner lens is a Fresnel lens that focuses the diverging light from the LEDs so that the light just fills and illuminates the outer lens without any appreciable amount of the light reflecting off of the optical reflector.

2. The traffic signal lamp of claim 1, wherein the LEDs are positioned on the mounting surface such that the diverging light therefrom is non-symmetric.

3. The traffic signal lamp of claim 1, wherein the lamp housing includes a lamp lens disposed over the LEDs.

4. The traffic signal lamp of claim 3, wherein the lamp lens focuses down or expands the diverging light from the LEDs.

5. The traffic signal lamp of claim 3, wherein the lamp lens focuses down or expands the diverging light from the LEDs in a non-symmetric manner.

6. The traffic signal lamp of claim 1, wherein the inner lens is non-planar.

7. The traffic signal lamp of claim 6, wherein a surface of the inner lens facing the outer lens is concave.

8. The traffic signal lamp of claim 1, wherein the inner lens collimates the diverging light from the LEDs.

9. The traffic signal lamp of claim 1, wherein a focusing power of the inner lens and a distance between the inner lens and the LEDs are selected so that the light from the LEDs illuminating the outer lens is substantially collimated.

10. The traffic signal lamp of claim 1, wherein the inner lens focuses the diverging light from the LEDs in a non-symmetric manner.

11. The traffic signal lamp of claim 1, wherein the outer lens focuses the light from the LEDs in a non-symmetric manner.

12. The traffic signal lamp of claim 1, wherein the mounting surface is selectively rotatable with respect to the threaded electrical connector.

13. The traffic signal lamp of claim 1, wherein the lamp housing includes an upper portion that contains the LEDs and a lower portion that is attached to the threaded electrical connector, and wherein the lamp housing upper portion is rotatably engaged with the lamp housing lower portion.

14. The traffic signal lamp of claim 13, further comprising:
 a spring disposed to exert a bias force between the lamp housing upper and lower portions to increase friction therebetween for selectively fixing an angular orientation between the lamp housing upper portion and the threaded electrical connector.

15. The traffic signal lamp of claim 14, wherein the lamp housing lower portion includes a retainer having external threads that engage internal threads formed on the lamp housing lower portion, and wherein the lamp housing upper portion includes a flange member that is rotatably engaged with the retainer.

16. A method of retrofitting a traffic signal lamp having a signal housing, a front door plate attached to the signal housing, an outer lens attached to the front door plate, an optical reflector disposed in the signal housing, a threaded electrical socket connector disposed in the signal housing, and an incandescent light bulb connected to the threaded electrical socket connector for producing light that is reflected off of the reflector and through the outer lens, the method including:
 at least partially detaching the front door plate to expose an inside of the signal housing;
 removing the incandescent light bulb from the threaded electrical socket connector;
 attaching a Fresnel lens to the front door plate;
 connecting an LED lamp to the threaded socket connector, wherein the LED lamp includes:
  a lamp housing,
  a power supply disposed in the lamp housing,
  a plurality of LEDs mounted to a substantially planar mounting surface in the lamp housing and electrically connected to the power supply for producing diverging light, and
  a threaded electrical connector extending from the lamp housing; and
 re-attaching the front door plate to the signal housing;
 wherein the Fresnel lens focuses the diverging light from the LEDs so that the light just fills and illuminates the outer lens without any appreciable amount of the light reflecting off of the optical reflector.

17. The method of claim 16, wherein the connecting of the LED lamp to the threaded socket connector includes screwing the threaded electrical connector into the threaded socket connector.

18. The method of claim 16, further comprising:
 selecting a focusing power of the Fresnel lens and a distance between the Fresnel lens and the LEDs so that the light from the LEDs illuminating the outer lens is substantially collimated.

19. The method of claim 18, wherein the diverging light from the LED lamp is non-symmetric.

20. The method of claim 19, wherein:
 the mounting surface is selectively rotatable relative to the threaded electrical connector; and
 the method further comprises selectively rotating the mounting surface relative to the threaded electrical connector after the LED lamp is connected to the socket connector.

* * * * *